United States Patent [19]

Wroczynski

[11] Patent Number: 4,882,414

[45] Date of Patent: Nov. 21, 1989

[54] POLYAMIDE FROM POLYMERIC FATTY ACID AND LONG CHAIN DICARBOXYLIC ACID

[75] Inventor: Ronald J. Wroczynski, Pittsfield, Mass.

[73] Assignee: Union Camp Corporation, Wayne, N.J.

[21] Appl. No.: 675,996

[22] Filed: Nov. 29, 1984

[51] Int. Cl.$^4$ ............................................. C08G 69/34
[52] U.S. Cl. ................................. 528/339.3; 528/338; 528/339; 528/340; 528/341; 528/349
[58] Field of Search ..................... 528/339.3, 338, 339, 528/340, 341, 349

[56] References Cited

U.S. PATENT DOCUMENTS 3,637,551 1/1972 Sprauer ............................. 528/339.3
3,852,226 12/1974 Sprauer ............................. 528/339.3

*Primary Examiner*—Harold D. Anderson
*Attorney, Agent, or Firm*—Edward J. Sites

[57] ABSTRACT

Polyamide hot-melt adhesives are prepared from condensation of a mixture of polymeric fatty acids and 1,18-octadecane-dicarboxylic acid or 1,16-hexadecanedicarboxylic acid and a substantially equivalent proportion of a polyamine.

3 Claims, No Drawings

POLYAMIDE FROM POLYMERIC FATTY ACID AND LONG CHAIN DICARBOXYLIC ACID

BACKGROUND OF THE INVENTION

1. Field of the Invention

The invention relates to polyamide polymers having hot melt adhesive properties and more particularly relates to polyamide resins prepared by the reaction of diamines with a mixture of dimer acids and a specific class of aliphatic dicarboxylic acids.

2. Brief Description of the Prior Art

The prior art is replete with descriptions of polyamide compositions having hot-melt adhesive properties and the methods of their preparation. Representative of the prior art adhesive compositions are those described in U.S. Pat. Nos. 3,377,303 and 3,444,026. The latter compositions comprise the reaction product of a dimer fatty acid and a wide variety of diamines. Copolymerizing dicarboxylic acids including aliphatic dicarboxylic acids such as adipic, sebacic and azelaic acids, are also taught as components of the adhesive compositions.

Polyamide compositions useful as hot-melt adhesives for adhering vinyl plastics are also disclosed in U.S. Pat. No. 3,847,875. The latter compositions are the reaction product of 1,8- or 1,9-heptadecanedicarboxylic acid and specific heterocyclic diamines such as piperazine. Copolymerizable dicarboxylic acids such as azelaic, sebacic and adipic acids are also disclosed as components of the adhesives.

The hot-melt polyamide compositions of the present invention are advantageous for their adhesive strengths in adhering to vinyl resins such as plasticized poly(vinyl chloride) especially at low melt viscosities. However, the compositions of the invention also have good adhesive strengths to degreased steel, aluminum, wood, and various other plastics such as polyolefins, ABS and polystyrene. Particularly advantageous are the compositions' resistance to moisture and elevated temperatures, maintaining good adhesive strengths at elevated temperatures and after exposure to high humidity and/or high temperature conditions.

The invention embodies the unexpected finding that when a 20- or 18-carbon linear dibasic acid is used as a copolymerizing diacid with a polymeric fatty acid and various diamines to prepare polyamide hot-melt adhesives, resins are obtained which have better tensile strengths at ambient and elevated temperatures and increased moisture resistance than when other copolymerizing diacids are used. It is believed that these property improvements are derived primarily from the increased crystallizability imparted to the polyamides by the long chain, linear 20- or 18-carbon dibasic acid. However, this explanation should in no way be considered as definitive or limiting to the scope of the invention.

SUMMARY OF THE INVENTION

The invention comprises the polyamide obtained on condensation of substantially equivalent proportions of a polyamine and a mixture of dicarboxylic acids, said mixture comprising a polymerized fatty acid and 1,18-octadecanedicarboxylic acid or less preferably, 1,16-hexadecanedicarboxylic acid.

DETAILED DESCRIPTION OF THE PREFERRED EMBODIMENTS OF THE INVENTION

The polyamide compositions of the invention are characterized in part by a softening point within the range of from about 90° C. to about 300° C., preferably 100° C. to 250° C., most preferred 100° C. to 150° C. and a final melt viscosity of at least 1,500 cps/195° C., preferably within the range of from about 1,500/195° C. to about 60,000/260° C. and most preferably between 2,000/195° C. to 30,000/246° C. cps. The polyamide compositions of the invention generally have tensile strengths of at least 300 psi, preferably at least 650 and elongations within the range of from about 100 to about 1000 percent. The acid and amine numbers are generally each less than 10, preferably less than 5.

The reactants employed to prepare the compositions of the invention are all well known as are the methods of their preparation. The polymeric fatty acids, sometimes referred to in the art as "dimer acids", are complex mixtures resulting from the polymerization of fatty acids. Representative of polymeric fatty acids are those commercially available from the polymerization of tall oil fatty acids. These polymeric fatty acids have a typical composition as follows:

|  | % BY WEIGHT |
|---|---|
| $C_{18}$ monobasic acids (monomer) | 0–10 |
| $C_{36}$ dibasic acids (dimer) | 60–95 |
| $C_{54}$ and higher polybasic acids (trimer) | 1–35 |

The relative ratios of monomer, dimer and trimer in unfractionated polymeric fatty acids are dependent on the nature of the starting material and the conditions of polymerization. Methods for the polymerization of fatty acids are described, for example, in the U.S. Pat. No. 3,157,681. The use of hydrogenated dimer acids improves the color and thermal and oxidative stability of the polyamides of the invention.

As described above, the polymerized fatty acid or a hydrogenated derivative is employed in admixture with 1,18-octadecanedicarboxylic acid or 1,16-hexadecanedicarboxylic acid, i.e., the dicarboxylic acid of formula:

$$\text{HOOC}-(\text{CH}_2)_{\overline{n}}\text{COOH}$$

where n=16 or 18.

The proportions of polymeric fatty acid and 1,18-octadecane-dicarboxylic acid or 1,16-hexadecanedicarboxylic acid in the acid component reactant used in the method of the invention may vary over a wide range. Preferred proportions are as follows:

| polymeric fatty acid | 95 to 40 equivalent % |
|---|---|
| 1,18-octadecanedicarboxylic acid or 1,16-hexadecanedicarboxylic acid | 5 to 60 equivalent % |

A wide variety of other (optional) dicarboxylic acids may also be employed together with the polymeric fatty acids and the 1,18-octadecanedicarboxylic acid (eicosanedioc acid) or 1,16-hexadecanedicarboxylic acid (octadecane dioic acid) in the preparation of the compositions of the invention. These additional dicarboxylic acids include aliphatic, cycloaliphatic and aromatic dicarboxylic acids. Representative of such optional acids, which may contain from 2 to 20 carbon atoms, are oxalic, glutaric, malonic, adipic, succinic, suberic, azelaic, sebacic, dodecanedioic pimelic, 1,4-cyclohexanedicarboxylic acid, phthalic, terephthalic, isophthalic, and naphthalene dicarboxylic acids. Methods of preparing these preferred acids are well known, and they are readily available commercially.

Preferred additional or optional dicarboxylic acids employed in the invention are straight chain aliphatic diacids having at least 6 carbon atoms and more preferably 6 to 16 carbon atoms, such as azelaic and sebacic acids, which are most preferred. It should be understood that use of the corresponding acid anhydrides, esters and acid chlorides of these acids is included in the term "dicarboxylic acid".

The proportion of optional dicarboxylic acid which may be used may be within the range of from about 0 to about 50 equivalent percent.

The organic polyamines preferably employed in preparing the compositions of the present invention may be one or more of the known linear aliphatic, cycloaliphatic or aromatic diamines having from about 2 to 20 carbon atoms. Preferred especially are the alkylene diamines. Illustrative of the preferred diamines are ethylene diamine (EDA), 1,3-diaminopropane, 1,4-diaminobutane, 1,6-hexamethylene diamine (HMDA), 4,4-methylene-bis-(cyclohexylamine) (PACM), dimer diamine prepared from polymeric fatty acids, 1,20-diamino eicosane, isophorone diamine, cyclohexanebis (methylamines), bis-1,4-(2 aminoethyl)-benzene, piperazine (PIP) 1,3-di-(4-piperidyl)propane (DIPIP) and 1-(2-aminoethyl) piperazine. Also preferred are the polyglycol diamines such as Jeffamine ® D-2000 available from Texaco and polyglycol diamine H-221 available from Union Carbide Corporation. Most preferred are the primary diamines EDA and PACM, alone or in combination with the secondary diamines PIP and DIPIP. These diamine compounds are all prepared by well known methods and many are commercially available.

The polyamide hot melt adhesives of the invention may be prepared according to the method of the invention by mixing, heating and reacting the mixture of acids with a substantially equivalent proportion of polyamine, to produce a neutral or balanced polyamide, i.e., the acid and amine numbers are substantially equal. By "substantially equivalent proportion" it is meant that the total number of amine groups provided in the reaction mixture should approximate the total number of acid groups presented by the mixture of acids. In practice this is accomplished by providing a slight excess (circa 2 percent) of the polyamine in the initial reaction mixture to compensate for the small proportion usually lost through volatilization under the conditions of the amidization reaction. The temperature at which this condensation polymerization is carried out is not critical, but is advantageously carried out at a temperature of from about 100° C. to about 300° C., preferably within the range of from about 180° C. to 300° C. To assist the polymerization, a polymerization catalyst may be added to the reaction mixture in a catalytic proportion. Representative of such catalysts is phosphoric acid.

The catalyst employed in the method of the invention may be charged to the initial reaction mixture or added just prior to when the polymerization rate slows. The preferred concentration of catalyst in the reaction is within the range of from about 0.001 to 3 weight percent, most preferably 0.01 to 1.0 percent by weight of the total charge.

In addition, it is understood that small amounts of surface active materials may be added to the polymerization to reduce foaming. Representative of such materials are Dow Corning's DB-100, silicone anti-foam.

It is advantageous to also include as a component of the polymerization reaction mixture, an antioxidant. Any of the well known antioxidants may be employed in conventional proportions, i.e., from 0.1 to about 2 percent by weight of the reactants.

In order to avoid undue discoloration of the polyamide product, the method of the invention is preferably carried out in an inert atmosphere such as is provided by carbon dioxide, nitrogen or argon gases. During the course of the reaction, amidization occurs with formation of long linear molecules and water. The formed water is advantageously allowed to distill out of the reaction mixture as the condensation polymerization occurs. Distillation may be assisted by allowing a slow stream of inert gas such as nitrogen to be bubbled through or over the reaction mixture. Although not necessary, an inert organic solvent such as xylene may be added to the reaction mixture in small proportions to assist removal of water by azeotropic distillation. Generally such proportion should not exceed about 10 percent by weight of the reaction mixture. The heating of the reaction mixture may be carried out until a selected viscosity of the reaction mixture is reached, e.g. 1,500 cps/195° C.–60,000 cps/260° C. and preferably 2,000/cps/195° C.–30,000 cps/246° C. In addition, small amounts (0.5 to 10 eq. %) of a saturated linear monobasic carboxylic acid containing 5–20 carbons such as for example stearic and palmitic acid, or other reactive monomers such as phenyl benzoate or triphenylphosphite may be added to the mixture to control molecular weight and viscosity.

The method of the invention may be carried out at atmospheric or slightly higher pressures. However, toward the end of the polymerization step it is advantageous to operate under a slight vacuum. This aids in removal of by-products, solvent and condensation water, unreacted diamine and in driving the polymerization to completion. Completion of the polymerization may also be observed when aliquots of the reaction mixture, taken periodically, indicate by analysis that the acid and amine numbers for the reaction mixture are each less than about 10, preferably less than 5. Generally polymerization is complete within about 1 to 7 hours, depending on the specific nature of the acid reactants. Any conventional and convenient reaction vessel may be used to condense the reactants and carry out the polymerization.

The following examples describe the manner and process of making and using the invention and set forth the best mode contemplated by the inventor of carrying out the invention, but are not to be construed as limiting.

TEST METHODS

The test methods used for evaluating the polyamide compositions of the invention as hot melt adhesives are as follows:

(1) Tensile and elongation tests—The method of Reference ASTM D1708-66 was used wherein resin dumbbells are conditioned at 72° F. and 50% relative humidity for 24 hours unless otherwise specified and then tested at a crosshead speed of 5 cm/min. on an Instron tester to demonstrate rate of force effect on elongation and tensile strengths.

(2) Softening points were determined by the method of ASTM-E 28-63 (ring and ball method).

(3) T-Peel strengths were determined by ASTM test method D-1876-72 at 60° C. and at 22° C.

(4) Melt viscosities were determined by the test method described in ASTM test method D-1084-63 Method.

(5) Lap Shear strengths were determined by the method described in ASTM test Method D-1002-72.

The relative crystallinites given are the heats of fusion in cal/g as determined on a Dupont 901 Differential Scanning Calorimeter with a Dupont 990 Controller. The heats of fusion were determined from the areas under the melting endotherms for samples heated at a rate of 10° C./min. Water absorptions were determined by ASTM method D570-63 after 7 days of immersion. Impact resistances were determined by ASTM test method D746-64T using methanol/dry ice as coolant.

EXAMPLES 1-2

These examples are not examples of the invention but are made for comparative purposes.

EXAMPLE 1

A polymer was prepared with the following reactants:

|  | Equivalent % |
|---|---|
| polymeric fatty acid* | 50 |
| sebacic acid | 50 |
| piperazine | 65 |
| ethylene diamine | 35 |

The reactants were all charged in a resin kettle and refluxed at a temperature of 120°-150° C. with stirring, under a blanket of nitrogen gas for 3 hours. The mixture was then heated gradually from reflux temperature to 200° C. while water was removed by distillation. Six drops of phosphoric acid were added, and the mixture was heated at temperatures of 220-240° C. under a vacuum of 0.05 to 5 mm Hg for 3 hours.

Unidyme ®14 having the composition:

|  |  |
|---|---|
| monomer | 0.4 wt % |
| dimer | 95.6 wt % |
| trimer (and higher polymer) | 4.0 wt % |

The resulting polyamide resin was allowed to cool to room temperature and representative portions were taken and examined for physical properties. The examination results are given in TABLES 1-4, below.

EXAMPLE 2

The procedure of Example 1, supra., was repeated except that a branched isomer of octadecane dicarboxylic acid, 7-ethyl-1,16-hexadecane dicarboxylic acid **, was used to replace the sebacic acid in equal proportion. The physical properties of the polyamide prepared are given below in TABLES 1 and 4.

** SB-20 ®, produced by Okamura Oil Mill, Ltd. of Japan, contains circa 80-90 weight percent 7-ethyl-1,16-hexadecane dicarboxylic acid and 10-20 weight percent of 6-ethyl-1,16-hexadecane dicarboxylic acid.

EXAMPLE 3

The procedure of Example 1, supra., was repeated except that 1,18 octadecane-dicarboxylic acid *** was used to replace the sebacic acid in an equal proportion. The physical properties of the polyamide so prepared is given below in TABLES 1-4.

*** SL-20 ®, produced by Okamura Oil Mills Ltd. of Japan, contains 85-90% by weight 1,18-octadecanedicarboxylic acid and 4-10% by weight of 1,14-dodecane-dicarboxylic acid.

TABLE 1

| THERMAL PROPERTIES | | | | | |
|---|---|---|---|---|---|
| Example No. | Visc/@ C (cps) | Soft Pt. (C°) | Tg (C°) | Tm (C°) | Heat of Fusion (cal/g) |
| 1 | 8300/195 1600/231 | 162 | 0 | 156 | 2.7 |
| 2 | 3000/195 | 72 | −6 | 67 | 1.5 |
| 3 | 10500/195 3000/231 | 146 | −8.5 | 138 | 6.2 |

TABLE 2

| COMPARATIVE TENSILE AND ADHESIVE PROPERTIES AT ROOM TEMPERATURE | | | | | |
|---|---|---|---|---|---|
| Example No. | Modulus (PSI) | Bk Strain (% elong.) | Tensile Strength (PSI) | Vinyl Peel (pli) | Steel Lapsh. (PSI) |
| 1 | 18700 | 393 | 1193 | — | 1431 |
| 3 | 18650 | 409 | 1859 | 6.9 | 1568 |

TABLE 3

| COMPARATIVE 60° C. TENSILE PROPERTIES | | | |
|---|---|---|---|
| Example No. | Modulus (PSI) | Tensile Strength (PSI) | Brk Strain (% elongation) |
| 1 | 2198 | 372 | 200 |
| 3 | 4479 | 611 | 308 |

TABLE 4

| Example No. | Crystal (cal/g) | H₂O Absorp (7 DAY W %) | IMPACT STRENGTH (% PASSING @ C.°) | | | | |
|---|---|---|---|---|---|---|---|
|  |  |  | 5 | 10 | 20 | 30 | 40 |
| 1 | 2.7 | 1.65 | — | — | — | 40 | 70 |
| 2 | 1.3 | 2.71 | — | — | — | — | — |
| 3 | 6.2 | 0.99 | 40 | 80 | 100 | — | — |

As can be observed from the above Examples 1 and 3, the polyamides made with 1,18-octadecane dicarboxylic acid and dimer acid had a higher tensile strength, higher modulus, lower Tg, better low temperature impact resistance, higher crystallinity, lower water absorption, and slightly higher steel lapshear adhesive strength relative to the comparative polymer prepared with sebacic acid and dimer acid. The higher tensile strength of the polyamide of Example 3 relative to the polymer of Example 1 was ascribed to the much higher crystallinity of the polymer containing the 1,18-octadecane dicarboxylic acid. This higher crystallinity is believed to result from the longer chain length of the 20 carbon diacid, which may allow for more crystallization with the dimer portion of the polyamide chain. The polyamide of Example 3 also had a higher tensile strength and elongation at 60° C. than the reference polymer of Example 1. This superiority may result from the much sharper melting point seen by differential scanning calorimetery of the dimer acid 1,18-octadecane dicarboxylic acid polyamide which allows for longer retention of the strengthening effect of the crystallinity in the polyamide of Example 3. The polymer of Example 3 also had slightly better low temperature impact resistance than the sebacic acid control polymer. Thus, 1,18-octadecane dicarboxylic acid appears to impart better low and high temperature performance relative to sebacic acid and the branched $C_{20}$ diacid.

In contrast, the polyamide of Example 2, prepared with dimer acid and the branched $C_{20}$ diacid isomers (SB-20) shows a very low softening point and low crystallinity when compared to either Examples 1 or 3. Therefore, it is obvious to one skilled in the art that the polyamide of Example 2 does not have the performance properties especially at 60° C., nor the moisture resistance found for the analogous polyamide of Example 3 prepared with the linear $C_{20}$ diacid isomer.

EXAMPLES 4–6

The general procedure of Example 1, supra., was repeated, except that the reactants as used therein were as follows:

| REACTANT | EXAMPLE 4 Equiv. % | EXAMPLE 5 Equiv. % | EXAMPLE 6 Equiv. % |
|---|---|---|---|
| Polymeric Fatty Acid (Union Camp Corp.; Unidyme ® 14) | 66.6 | 56.0 | 58.0 |
| 1,18-oxtodecane-dicarboxylic acid (SL-20 ®, supra.) | 28.2 | 40.6 | — |
| azelaic acid Emerox ® 1144 | — | — | 41.0 |
| ethylenediamine | 47.0 | 50.5 | 28.0 |
| piperazine | 49.4 | 44.9 | 67.0 |
| polyglycol diamine (H-221 ®, supra. Jefferson Chemical Co.) | 3.6 | 4.5 | 5.0 |

The physical properties of the resulting polymers are given in TABLE 5, below.

TABLE 5

| Example No. | Water Absorp 7 days (Wt %) | Soft Pt (C.°) | Heat of Fusion (Cryst) (cal/g) | Visc (cps/195° C.) | Adhesion to Plasticized Vinyl T-Peel Adh. Str. (pli) 22° C. | 65° C./ H2O/2H[a] |
|---|---|---|---|---|---|---|
| 4 | 1.05 | 128 | 2.9 | 10200 | 26 | 8 |
| 5 | 1.03 | 147 | 2.8 | 12800 | 10 | 5 |
| 6 | 1.54 | 138 | 1.2 | 8500 | 26 | 2 |

[a]Data for samples tested at 60° C. after soaking in water for 2 hours at 60° C.

EXAMPLES 7–12

The general procedure of Example 1, supra., was repeated except that the reactants as used therein were replaced as follows:

| REACTANTS | Ex. 7 Equiv. % | Ex. 8 Equiv. % | Ex. 9 Equiv. % | Ex. 10 Equiv. % | Ex. 11 Equiv. % | Ex. 12 Equiv. % |
|---|---|---|---|---|---|---|
| polymeric fatty acid | 87.7 | 95.0 | 70.0 | 87.7 | 95.0 | 70.0 |
| 1,18-octadecane-dicarboxylic acid (SL-20, supra.) | 12.3 | 5.0 | 30.0 | — | — | — |
| sebacic acid | — | — | — | 12.3 | 5.0 | 30.0 |
| ethylene-diamine | 37.3 | 55.0 | 30.0 | 37.3 | 55.0 | 30.0 |
| piperazine | 62.7 | 45.0 | 70.0 | 62.7 | 45.0 | 70.0 |

*Unidyme ® 14, supra.

The physical properties of the resulting polymers are given in Table 6, below.

TABLE 6

| Example No. | Water absorption 7 Day (wt %) | Soft Pt (°C.) | Visc (cps @ 195° C.) | Cryst[a] (cal/g) | Tensile Str 22° C. | (psi) 60° C. |
|---|---|---|---|---|---|---|
| 7 | 1.03 | 96 | 9940 | 1.59 | 439 | 59 |
| 8 | 0.78 | 91 | 10200 | 3.29 | 747 | 17 |
| 9 | 0.96 | 115 | 11600 | 4.27 | 1010 | 97 |
| 10 | 1.13 | 96 | 9460 | 1.35 | 250 | 31 |
| 11 | 0.85 | 95 | 12320 | 1.97 | 723 | 26 |
| 12 | 1.17 | 120 | 16750 | 0.85 | 670 | 132 |

| Example No. | Tensile Strength water soak | Vinyl Peel Strength 22° C. | Vinyl Peel Strength 60° C. | Steel-Steel Lapshear Adhesion (psi) |
|---|---|---|---|---|
| 7 | 230 | 29 | 5 | 655 |
| 8 | 355 | 21 | 5 | 723 |
| 9 | 740 | 23 | 6 | 932 |
| 10 | 74 | 50 | | 557 |
| 11 | 304 | 33 | | 752 |
| 12 | 270 | 47 | | 876 |

[a]Cryst = Heat of Fusion
[b]Samples tested at room temperature after 21 days of immersion in water.

Examples 10–12 are not examples of the invention but are made for comparative purposes.

Examples 7–12 illustrate the advantages of using a linear $C_{20}$ diacid over a linear $C_{10}$ diacid (sebacic acid). In all comparative examples (7 versus 10, 8 versus 11 and 9 versus 12), the polyamides prepared with 1,18-octadiene dicarboxylic acid have lower moisture absorptions and higher tensile strengths at room temperature, and especially after a 21 day immersion in water.

EXAMPLE 13

The procedure of Example 3, supra., was repeated except that the 1,18-octadecanedicarboxylic acid as used therein was replaced with an equivalent weight proportion of 1,16-hexadecane-dicarboxylic acid. The resulting polyamide composition possesses properties similar to those associated with the product of Example 3, supra.

What is claimed is:

1. A polyamide which comprises the polyamide product of the polymerization reaction of a mixture of polyacids which comprises
   (a) from 40 to 95 equivalent percent of a polymeric fatty acid; and
   (b) from 5 to 60 equivalent percent of a diacid selected from the group consisting of 1,18-octadecanedicarboxylic acid and 1,16-hexadecane-dicarboxylic acid; with a substantially equivalent proportion of a polyamine wherein the polyamine comprises a mixture of from 40 to 80 equivalent percent piperazine and from 20 to 60 equivalent percent ethylenediamine.

2. A polyamide which comprises the polyamide product of the polymerization reaction of a mixture of polyacids which comprises
- (a) from 40 to 95 equivalent percent of a polymeric fatty acid; and
- (b) from 5 to 60 equivalent percent of a diacid selected from the group consisting of 1,18-octadecanedicarboxylic acid and 1,16-hexadecanedicarboxylic acid; with a substantially equivalent proportion of a polyamine wherein the polyamine comprises a mixture of ethylenediamine and 1,3-di(4-piperidyl) propane.

3. A polyamide which comprises the polyamide product of the polymerization reaction of a mixture of polyacids which comprises
- (a) from 40 to 95 equivalent percent of a polymeric fatty acid; and
- (b) from 5 to 60 equivalent percent of a diacid selected from the group consisting of 1,18-octadecanedicarboxylic acid and 1,16-hexadecanedicarboxylic acid; with a substantially equivalent proportion of a polyamine wherein the polyamine comprises a mixture of piperazine and a compound selected from the group consisting of 1,20-diaminoeicosane and 1,18-diaminooctadecane.

* * * * *